United States Patent
Barnes et al.

(10) Patent No.: US 9,235,217 B2
(45) Date of Patent: Jan. 12, 2016

(54) AUTOMATIC DUAL ROTOR SPEED CONTROL FOR HELICOPTERS

(75) Inventors: Greg W. Barnes, Cheshire, CT (US);
Eileen F. Horbury, Bethany, CT (US);
Eric W. Jacobs, Cheshire, CT (US);
Kenneth J. Buckman, Branford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 2619 days.

(21) Appl. No.: 11/536,128

(22) Filed: Sep. 28, 2006

(65) Prior Publication Data

US 2007/0118254 A1 May 24, 2007

Related U.S. Application Data

(60) Provisional application No. 60/726,883, filed on Oct. 3, 2005.

(51) Int. Cl.
*B64C 27/00* (2006.01)
*G05D 1/08* (2006.01)
*B64C 27/57* (2006.01)

(52) U.S. Cl.
CPC .............. *G05D 1/0858* (2013.01); *B64C 27/57* (2013.01)

(58) Field of Classification Search
CPC .............................. G05D 1/0858; B64C 27/57
USPC ........... 244/194, 180, 75.1, 175, 17.21, 17.13
See application file for complete search history.

(56) References Cited

U.S. PATENT DOCUMENTS

| | | | |
|---|---|---|---|
| 2,650,046 A | 8/1953 | Vanderlip | |
| 2,680,579 A | 6/1954 | Hohenemser | |
| 2,991,618 A * | 7/1961 | Marscher et al. | 60/39.281 |
| 3,105,659 A | 10/1963 | Stutz | |
| 3,295,795 A * | 1/1967 | Salai et al. | 244/17.17 |
| 3,429,376 A | 2/1969 | Hohenemser | |
| 4,466,526 A * | 8/1984 | Howlett et al. | 477/113 |
| 4,500,966 A | 2/1985 | Zagranski et al. | |
| 4,801,110 A * | 1/1989 | Skutecki | 244/17.13 |
| 4,818,992 A * | 4/1989 | Paterson | 340/970 |

(Continued)

FOREIGN PATENT DOCUMENTS

FR 2844607 3/2004

OTHER PUBLICATIONS

Schaefer, Carl G., et al. "Enhanced Energy Maneuverability for Attack Helicopters Using Continuous, Variable (C-V) Rotor Speed Control." Proceedings of the 47th Annual National Forum of the American Helicopter Society, Phoenix, AZ, May 6-8, 1991.*
Best, David. Photograph of Bell AH-1G Helicopter. Retrieved from http://web.archive.org/web/20040820201143/http://www.aero-web.org/database/museums/getimage.htm?id=4108. Photograph retrieved for internet archive on Aug. 20, 2004.*

(Continued)

*Primary Examiner* — Timothy D Collins
*Assistant Examiner* — Michael Kreiner
(74) *Attorney, Agent, or Firm* — Carlson, Gaskey & Olds, P.C.

(57) ABSTRACT

A flight control system for a helicopter having a main rotor and a tail rotor is provided. The flight control system includes an automatic rotor speed control being configured to transition the main rotor and the tail rotor between a high speed and a low speed based upon a plurality of received information without requiring any pilot action, the plurality of received information comprising height above ground level, knot indicated air speed, outside air temperature, barometric altitude, pressure altitude, density altitude, and an engine operational status.

24 Claims, 7 Drawing Sheets

(56) References Cited

U.S. PATENT DOCUMENTS

| | | | |
|---|---|---|---|
| 4,831,567 A * | 5/1989 | Lea | 703/8 |
| 4,998,202 A * | 3/1991 | Walsh et al. | 701/100 |
| 5,165,240 A * | 11/1992 | Page et al. | 60/719 |
| 5,314,147 A * | 5/1994 | Ebert et al. | 244/182 |
| 5,607,122 A * | 3/1997 | Hicks et al. | 244/17.19 |
| 5,782,433 A | 7/1998 | Goi et al. | |
| 6,198,991 B1 * | 3/2001 | Yamakawa et al. | 701/16 |
| 6,793,173 B2 * | 9/2004 | Salesse-Lavergne | 244/17.13 |
| 2004/0059470 A1 * | 3/2004 | Hu et al. | 701/1 |

OTHER PUBLICATIONS

Odilyn L. Santa Maria, "Two-Dimensional Fourier Transform Applied to Helicopter Flyover Noise," NASA/TM-1999-209114, Mar. 1999.

Extended European Search Report dated May 6, 2013 for European Patent Application No. 06851713.5.

* cited by examiner

Rotors transition from High Speed to Low Speed if:

Both engines are operative. ~42

AND

The height above ground is at or above a predetermined height for a predetermined time period. ~42

AND

The pressure altitude (PA) is below a predetermined PA for the predetermined time period. ~42

AND

The density altitude (DA) is below a predetermined DA for the predetermined time period. ~42

AND

The outside air temperature (OAT) is below a predetermined OAT for the predetermined time period. ~42

AND

The knot indicated air speed (KIAS) is at or above a predetermined KIAS for the predetermined time period. ~42

AND

A non-training mode is selected. ~42

*Fig. 3*

AUTOMATIC DUAL ROTOR SPEED CONTROL FOR HELICOPTERS

CROSS REFERENCE TO RELATED APPLICATIONS

This application claims the benefit of U.S. Provisional Application Ser. No. 60/726,883 filed Oct. 3, 2006, the contents of which are incorporated by reference herein.

BACKGROUND OF THE INVENTION

1. Field of the Invention

The present invention is directed to helicopter rotor speed controls. More specifically, the present invention is directed to automatic dual rotor speed controls, which automatically transition between a high rotor speed and a lower rotor speed based upon received flight information.

2. Description of Related Art

Many helicopters include a main rotor and a tail rotor that are integrally connected together and driven by one or more engines. One known method for reducing a helicopter's noise level is to reduce the speed of the main and tail rotors. That is, it is known in the art to design a helicopter with a system, which incorporates a variable speed that enables the pilot to manually vary the speed of the main and tail rotors from a normal mode (e.g., high rotor speed) to a quiet mode (e.g., low rotor speed). More specifically, it is known, to design a helicopter with a pilot control system wherein when the pilot manually activates/deactivates the system so that the helicopter's flight control system reduces/increases the speed of the main and tail rotors so that the helicopter's noise levels are reduced/increased. To varying degrees and purposes, changing rotor speed has been automated, in particular based on density altitude and/or airspeed.

Future helicopters will strive to satisfy the Federal Aviation Administration (FAA) noise level requirements for the Quiet Aircraft Technology Designation (QATD). Accordingly, there is a continuing desire for helicopters and flight control systems that are capable of operating at lower noise levels.

BRIEF SUMMARY OF THE INVENTION

A flight control system for a helicopter having a main rotor and a tail rotor is provided. The flight control system includes an automatic rotor speed control being configured to transition the main rotor and the tail rotor between a high speed and a low speed based upon a plurality of received information without requiring any pilot action, the plurality of received information comprising height above ground level, knot indicated air speed, outside air temperature, barometric altitude, pressure altitude, density altitude, and an engine operational status.

In some embodiments, the automatic rotor speed control transitions the main and tail rotors from the low speed to the high speed if the plurality of received information comprises any one of a plurality of inhibits. In other embodiments, the automatic rotor speed control transitions the main and tail rotors from the high speed to the low speed if the plurality of received information comprises one or more acceptance conditions.

A flight control system for a helicopter having a main rotor and a tail rotor is also provided. The flight control system includes a full authority digital engine controller for each engine of the helicopter, an air data computers for collecting and determining a plurality of flight data, a radar altimeters for collecting height above ground level data, and an automatic rotor speed control resident on the full authority digital engine controller. The automatic rotor speed control is configured to control the full authority digital engine controller to automatically adjust the speed of rotors of the helicopter based upon the plurality of flight data and the height above ground level data.

A helicopter having a main rotor, a tail rotor, a flight control system, and an automatic rotor speed control resident on the flight control system is provided. The automatic rotor speed control is configured to transition a speed of the main and tail rotors between a high speed and a low speed based on received flight information without requiring any pilot action.

The above-described and other features and advantages of the present invention will be appreciated and understood by those skilled in the art from the following detailed description, drawings, and appended claims.

BRIEF DESCRIPTION OF THE SEVERAL VIEWS OF THE DRAWINGS

FIGS. 2 and 3 are flow charts illustrating the automatic rotor speed control of FIG. 1;

FIG. 1A schematically illustrates an exemplary vertical takeoff and landing (VTOL) rotary-wing aircraft 100. The aircraft 100 in the disclosed, non-limiting embodiment includes a main rotor system 102 supported by an airframe 104 having an extending tail 106 which mounts an anti-torque system 108 as generally understood.

DETAILED DESCRIPTION OF THE INVENTION

Figure 1:
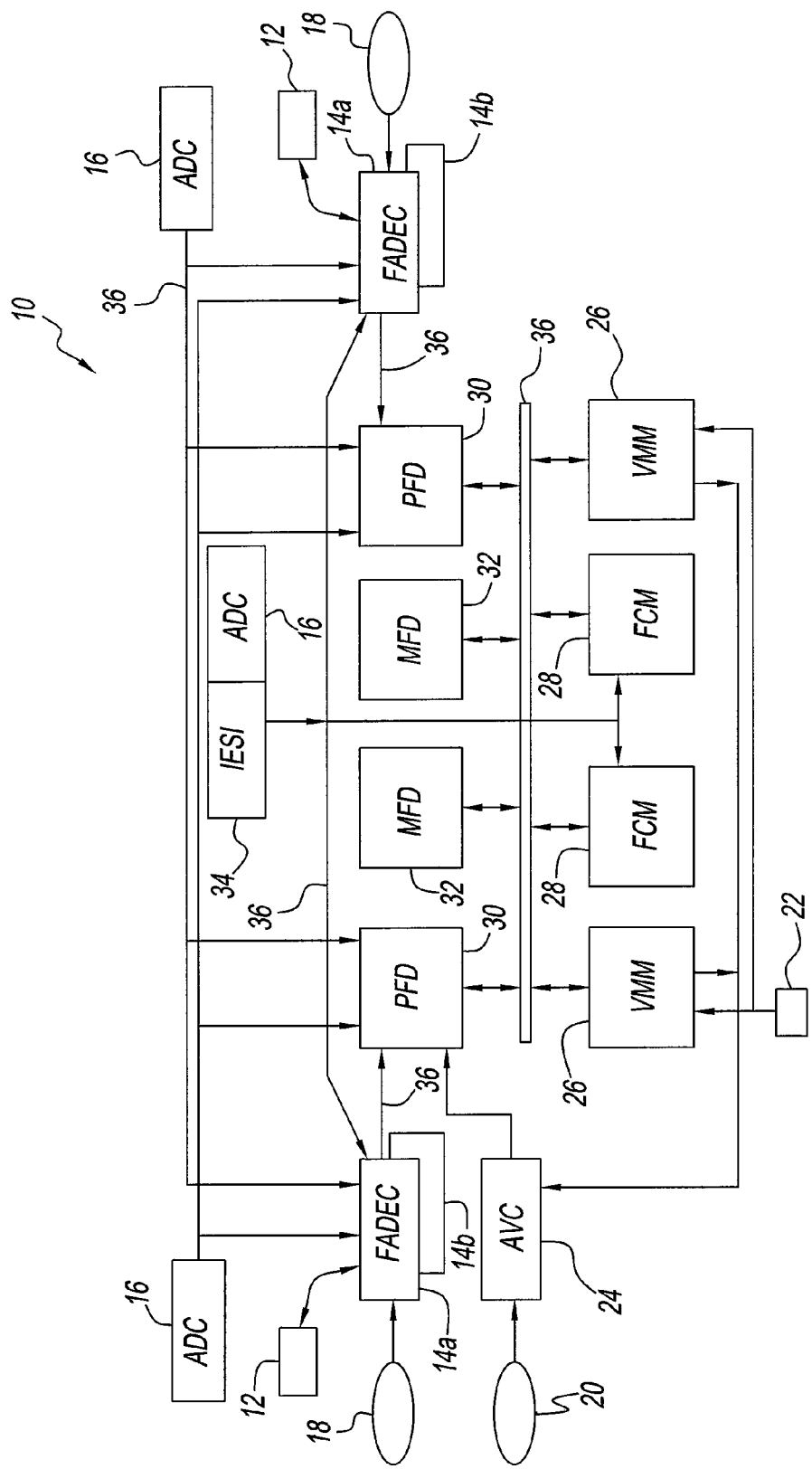
FIG. 1A is a general schematic view of an exemplary rotary wing aircraft embodiment for use with the present invention.
FIG. 1B is schematic diagram of a flight control system having an automatic rotor speed control according to the present disclosure.
Figure 1A:
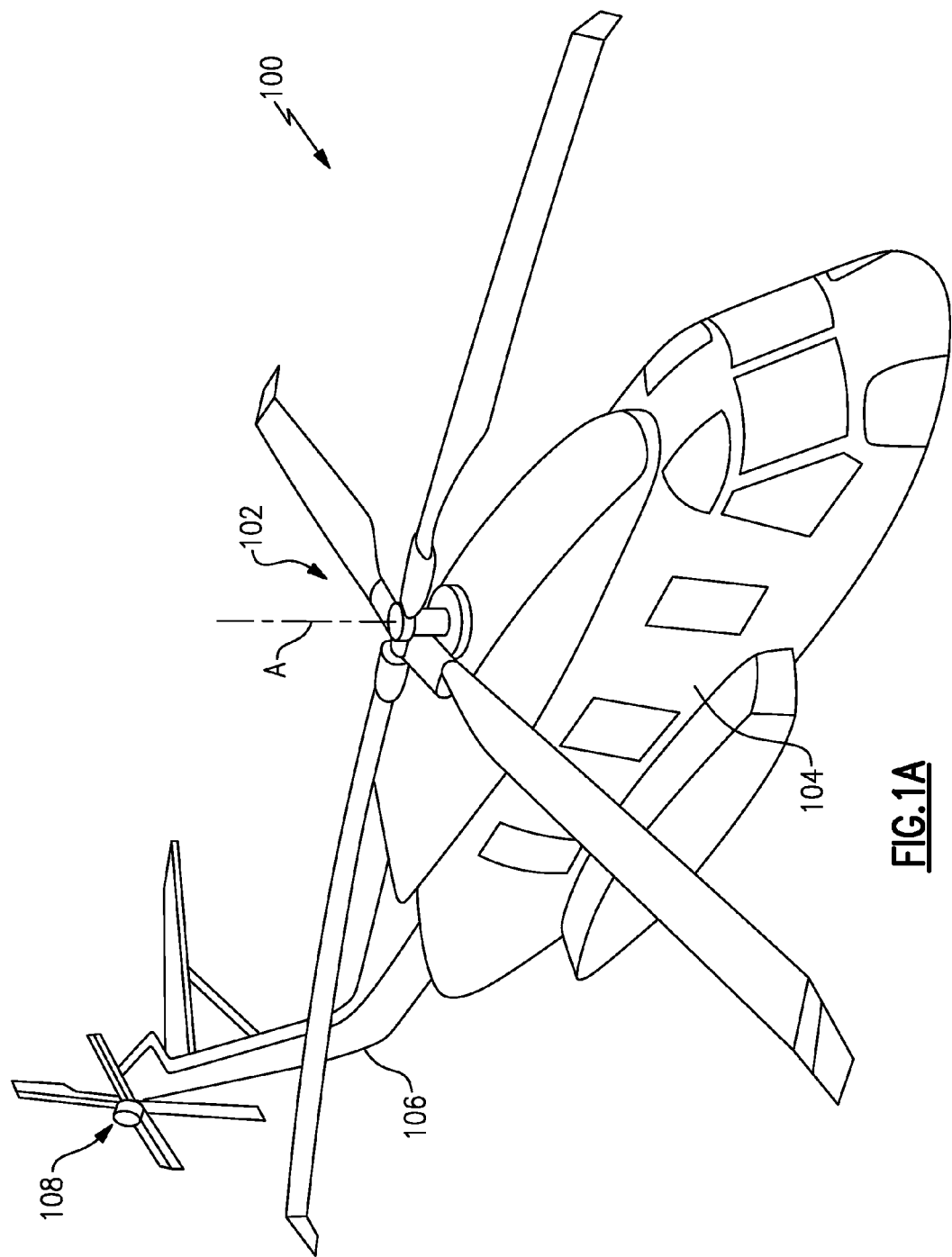
Figure 1B:
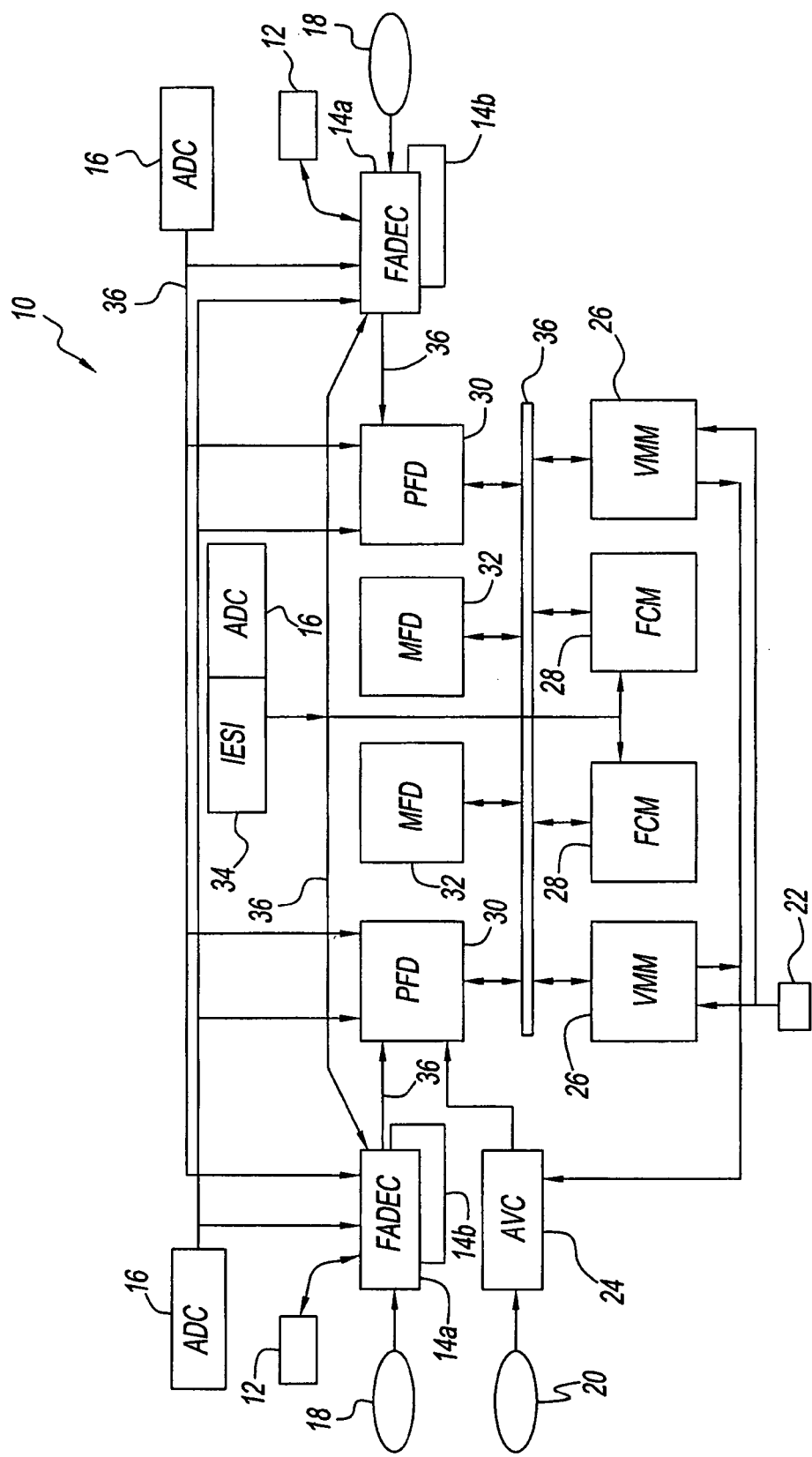

Referring to FIG. 1B, a flight control system according to the present disclosure is generally referred to by reference number 10 and is shown configured for use with a helicopter (not shown) having two engines. Advantageously, flight control system 10 includes automatic rotor speed control 12 resident thereon.

Rotor speed control 12 is configured to automatically transition the helicopter's main and tail rotors from a high-speed to a low-speed based on one or more types of received flight information. In this manner, flight control system 10 having rotor speed control 12 can switch to and from a low noise operational mode without requiring any pilot action.

Flight control system 10 includes a Full Authority Digital Engine Controller (FADEC) 14 for each engine. Preferably, flight control system 10 includes a primary FADEC 14a and a secondary FADEAC 14b for each engine. Control 12 is resident on each FADEC 14.

The remaining portions of flight control system 10 function in a manner known in the art by collecting various flight data and communicating this flight data to the pilot(s).

For collecting flight data and information, flight control system 10 includes one or more air data computers 16 (three shown) for collecting and determining a plurality of flight data including, but not limited to, knot indicated air speed (KIAS), outside air temperature (OAT), barometric altitude (BA), pressure altitude (PA), density altitude (DA), and other data. Flight control system 10 also includes one or more radar altimeters 18 (two shown) for collecting flight data such as a height above ground level (AGL). Additionally, flight control system 10 includes one or more blade speed sensors 20 and one ore more collective position sensors 22.

In some embodiments, flight control system 10 can include an active vibration controller 24 as is known in the art for controlling vibration induced from the blades.

Flight control system 10 further includes one or more vehicle monitoring modules 26 (two shown) that provide an interface between the various avionics systems and the FADEC 14. For example, vehicle monitoring modules 26 can receive information related to engine operational status, whether a training mode or a non-training is selected, and others. In some embodiments, flight control system 10 can include one or more flight control modules 28 (two shown) that can be used for automatic pilot operations.

In order to communicate flight information to the pilot(s), flight control system 10 includes one or more pilot flight displays 30 (two shown), one or more multi-function displays 32 (two shown), and at least one integrated electronic stand-by instruments (IESI) 34.

Flight control system 10 communicates information among its components across one or more information buses 36.

In operation, flight control system 10 uses FADEC 14, pilot inputs, and the various received flight data to control the operation of the helicopter in a known manner. Advantageously, flight control system 10 includes automatic rotor speed control 12 resident on FADEC 14, where the speed control is configured to control the FADEC to automatically adjust the rotor speed based upon one or more received flight data.

The detailed operation of automatic rotor speed control 12 are described with reference to FIGS. 2 and 3.

In operation, control 12 resident on FADEC 14 utilizes flight data such as, but not limited to KIAS, OAT, PA, DA and other information received from the helicopter's ADCs 16 and height AGL received from the helicopter's radar altimeters 18. Control 12 utilizes this information to determine when to automatically transition the helicopter's main and tail rotor speeds back-and-forth between a high speed (e.g., approximately 107%) and a low speed (e.g., approximately 102%). The use of the ADCs 16 and radar altimeters 18 to obtain the desired parameters can be accomplished by any means known in the art. Furthermore, the varying of the main and tail rotor speeds can be accomplished by any method known in the art.

Figure 2:
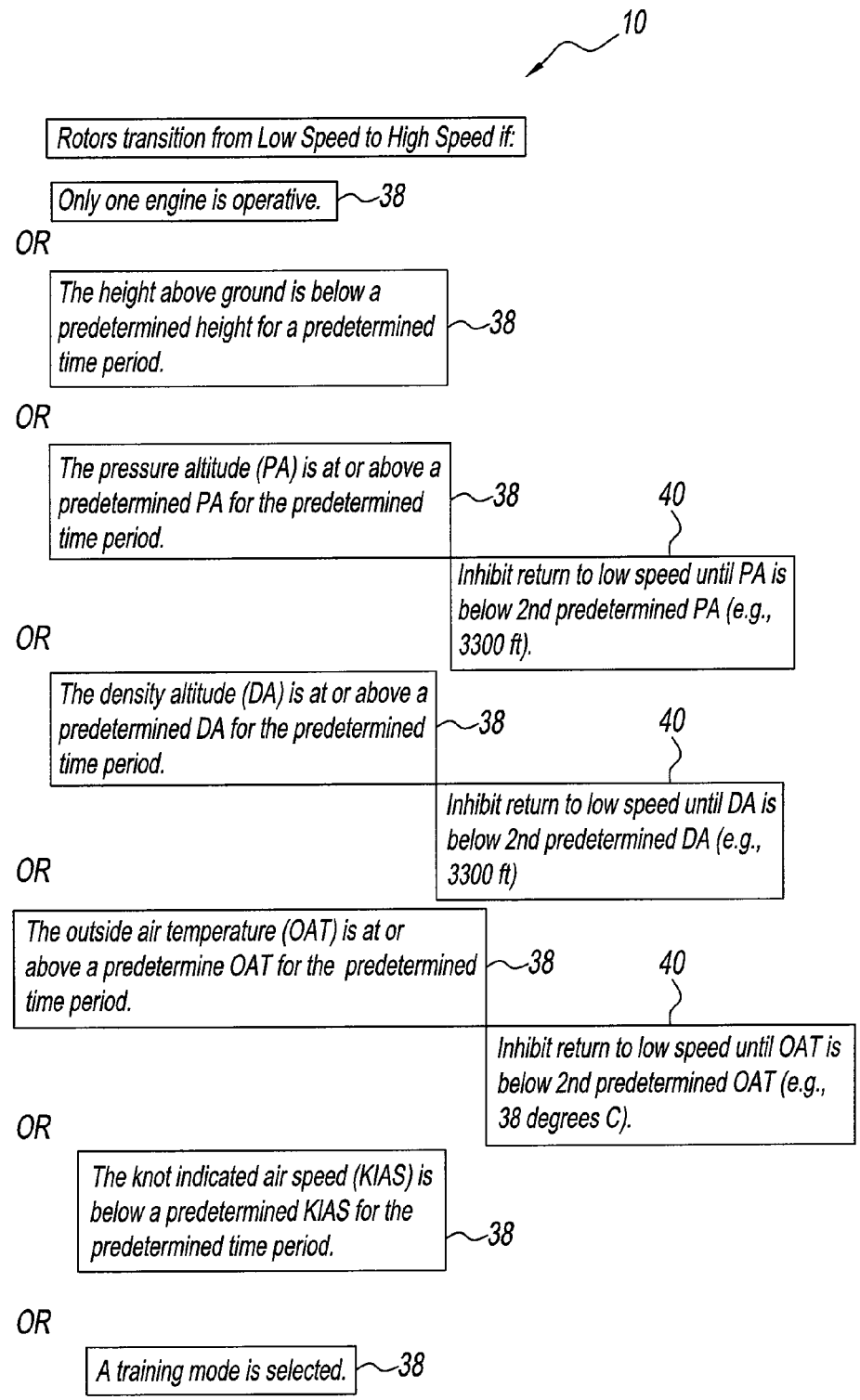

As seen in FIG. 2, control 12 transitions the main and tail rotors from a low speed (e.g., speed of 102%) to a high speed (e.g., speed of 107%) if any one of a plurality of inhibits 38 is detected. The inhibits 38 can include (1) only one engine is operative, (2) a height above ground level is below a predetermined height (e.g., 150 feet), (3) a pressure altitude is at or above a predetermined altitude (e.g., 3500 feet), (4) a density altitude is at or above a predetermined altitude (e.g., 4000 feet), (5) an outside air temperature is at or above a predetermined temperature (e.g., 40 degrees Celsius), (6) a knot indicated air speed is below a predetermined speed (e.g., 50 knots), and (7) a training mode is selected.

In some embodiments, control 12 can, upon detection of inhibit 38, transition from the low speed to the high speed at a predetermined acceleration rate such as about 1% per second.

In order to provide stability to the helicopter, namely to prevent rapid movement back-and-forth between the high and low rotor speeds, control 12 can, in some embodiments, require the inhibit 38 to be present for a predetermined period of time (e.g., three seconds) before transitioning the main and tail rotors from the low speed to the high speed.

Further, control 12 can, in some embodiments, provide stability to the helicopter by preventing transition back to the low speed until inhibit 38 has returned to at least a second inhibit 40. For example, if control 12 determines that the density altitude is at or above the predetermined altitude (e.g., 4000 feet) such that the control transitions from the low speed to the high speed, then the control can also inhibit transition back to the low speed until the density altitude is below a second predetermined altitude (e.g., 3800 feet). In this manner, control 12 can provide an envelop of operation where transitioning between high-and-low speeds and be inhibited to ensure operational stability to the helicopter.

As seen in FIG. 3, control 12 transitions the main and tail rotors from a high speed (e.g., speed of 107%) to a low speed (e.g., speed of 102%) if one or more acceptance conditions 42 is detected. The acceptance conditions 42 can include (1) both engines being operative, (2) a height above ground level is at or above a predetermined height (e.g., 150 feet), (3) a pressure altitude is below a predetermined altitude (e.g., 3500 feet), (4) a density altitude is below a predetermined altitude (e.g., 4000 feet), (5) an outside air temperature is below a predetermined temperature (e.g., 40 degrees Celsius), (6) a knot indicated air speed is at or above a predetermined speed (e.g., 50 knots), (7) a non-training mode is selected, and any combinations thereof.

In some embodiments, control 12 can, upon detection of acceptance condition 42, transition from the high speed to the low speed at a predetermined deceleration rate such as about 1% per second.

In order to provide stability to the helicopter, namely to prevent rapid movement back-and-forth between the high and low rotor speeds, control 12 can require the acceptance condition 42 to be present for a predetermined period of time (e.g., three seconds) before transitioning the main and tail rotors from the high speed to the low speed.

Figure 4:
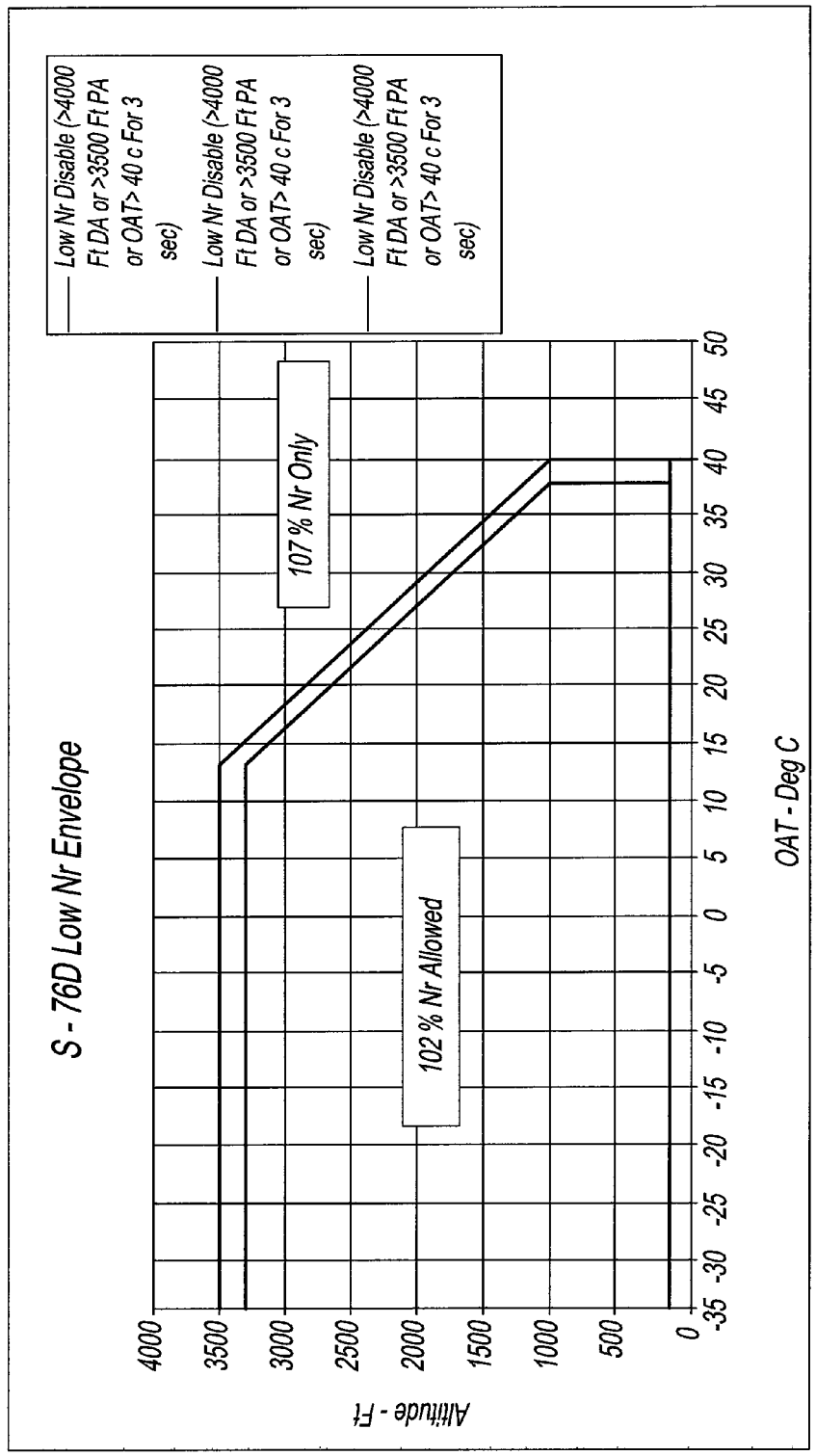
FIG. 4 is a graph illustrating outside air temperature and altitude as a function of the automatic rotor speed control of the present disclosure.

Referring now to FIG. 4, a Sikorsky S-76D helicopter having control 12 was analyzed. Here, a low rotor speed and high rotor speed are illustrated with respect to an outside air temperature and the DA altitude inhibit. Moreover, rotor speeds illustrate the envelope of operation between the DA altitude inhibit and the second predetermined altitude.

Figure 5:
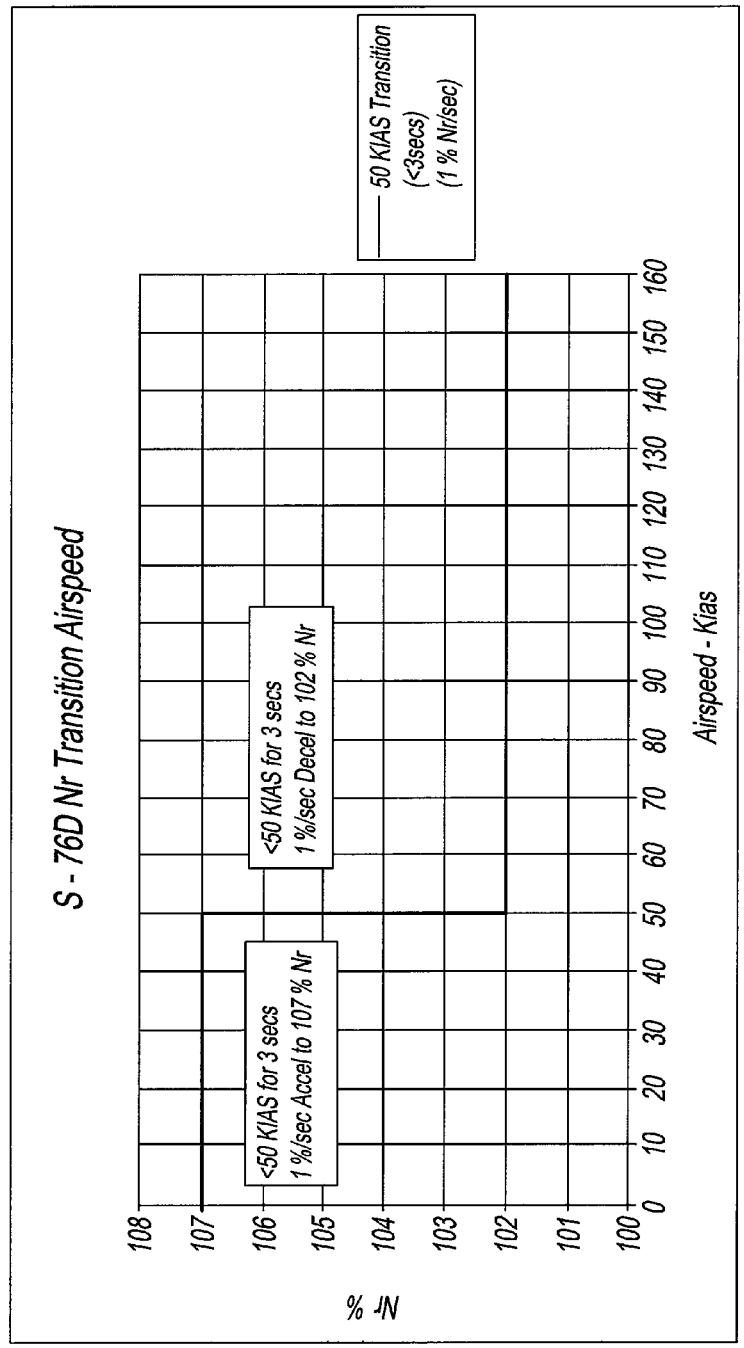
FIG. 5 is a graph illustrating air speed and rotor speed as a function of the automatic rotor speed control of the present disclosure.

Referring now to FIG. 5, a Sikorsky S-76D helicopter having control 12 was analyzed. Here, a transition airspeed of 50 KIAS and a 150 ft AGL altitude inhibit were selected so as to not interfere with the Category A and B takeoff and landing profiles. These methodologies could be applied to other helicopters resulting in slightly different transition airspeeds, outside air temperatures, altitude inhibits, and/or predetermined time periods with similar benefits.

Accordingly, flight control system 10 uses FADEC 14 having control 12 to automatically vary the main and tail rotor speeds depending upon received flight information. Advantageously, control 12 significantly reduces the helicopter's external acoustic signature during takeoff, flyover, and descent profiles.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A flight control system for a rotary-wing aircraft having at least one rotor, comprising:
an automatic rotor speed control configured to transition the at least one rotor between a high speed, normal operational mode and a low speed, low noise operational mode in response to a plurality of received information without pilot action, said automatic rotor speed control configured to transition the at least one rotor from the low speed, low noise operational mode to the high speed, normal operational mode if any one of said plurality of received information comprises at least one of a plurality of inhibits.

2. The flight control system as in claim 1, wherein said plurality of inhibits comprises at least one of: an engine operational status having only one engine operative, a height above ground level being below a predetermined height, a pressure altitude being at or above a predetermined pressure altitude, a density altitude being at or above a predetermined density altitude, an outside air temperature being at or above a predetermined temperature, a knot indicated air speed being below a predetermined speed.

3. The flight control system as in claim 2, wherein said predetermined height comprises 150 feet, said predetermined pressure altitude comprises 3500 feet, said predetermined density altitude comprises 4000 feet, said predetermined temperature comprises 40 degrees Celsius, said predetermined speed comprises 50 knots.

4. The flight control system as in claim 1, wherein said plurality of inhibits further comprises a training mode.

5. The flight control system as in claim 1, wherein said automatic rotor speed control is configured to transition the at least one rotor from the low speed, low noise operational mode to the high speed, normal operational mode at a predetermined acceleration rate.

6. The flight control system as in claim 1, wherein said automatic rotor speed control is configured to transition the at least one rotor from the low speed, low noise operational mode to the high speed, normal operational mode if said plurality of received information comprises at least one of said plurality of inhibits being received for a predetermined period of time.

7. The flight control system as in claim 1, wherein said automatic rotor speed control is configured to prevent return to the low speed, low noise operational mode from said normal operational mode until said plurality of inhibits has cleared.

8. The flight control system as in claim 1, wherein said automatic rotor speed control is configured to transition the at least one rotor from the high speed, normal operational mode to the low speed, low noise operational mode if said plurality of received information comprises at least one acceptance conditions.

9. The flight control system as in claim 8, wherein said at least one acceptance conditions comprises an engine operational status having two engines operative, a height above ground level being at or above a predetermined height, a pressure altitude being below a predetermined pressure altitude, a density altitude being below a predetermined density altitude, an outside air temperature being below a predetermined temperature, a knot indicated air speed being at or above a predetermined speed.

10. The flight control system as in claim 9, wherein said predetermined height comprises 150 feet, said predetermined pressure altitude comprises 3500 feet, said predetermined density altitude comprises 4000 feet, said predetermined temperature comprises 40 degrees Celsius, said predetermined speed comprises 50 knots.

11. The flight control system as in claim 8, wherein said one or more acceptance conditions further comprises a non-training mode being selected.

12. The flight control system as in claim 8, wherein said automatic rotor speed control is configured to transition the at least one rotor from the high speed, normal operational mode to the low speed, low noise operational mode at a predetermined deceleration rate.

13. The flight control system as in claim 12, wherein said at least one rotor comprises a main rotor and a tail rotor.

14. The flight control system as in claim 8, wherein said automatic rotor speed control is configured to transition the at least one rotor from the low speed, low noise operational mode to the high speed, normal operational mode if said plurality of received information comprises at least one of said plurality of inhibits being received for a predetermined period of time.

15. The flight control system as in claim 1, wherein said plurality of received information comprises at least one of a-said height above ground level, a knot indicated air speed, an outside air temperature, a barometric altitude, a pressure altitude, a density altitude, and an engine operational status.

16. The flight control system as recited in claim 1, wherein said high speed, normal operational mode is a 107% rotor speed and said low speed, low noise operational mode is a 102% rotor speed.

17. The flight control system as recited in claim 16, wherein said automatic rotor speed control is configured to transition between said high speed, normal operational mode and said low speed, low noise operational mode at a predetermined acceleration rate.

18. The flight control system as recited in claim 16, wherein said automatic rotor speed control is configured to transition between said high speed, normal operational mode and said low speed, low noise operational mode at approximately 1% per second.

19. A flight control system for a rotary-wing aircraft having at least one rotor and at least one engine, comprising:
a full authority digital engine controller for said at least one engine;
an air data computer for collecting and determining a plurality of flight data;
a radar altimeter for collecting height above ground level data; and
an automatic rotor speed control resident on said full authority digital engine controller, said automatic rotor speed control configured to control said full authority digital engine controller to automatically adjust a speed of said at least one rotor in response to said plurality of flight data and said height above ground level data.

20. The flight control system as in claim 19, further comprising a primary full authority digital engine controller and a secondary full authority digital engine controller for each engine of the helicopter.

21. The flight control system as in claim 19, wherein said plurality of flight data comprises knot indicated air speed, outside air temperature, barometric altitude, pressure altitude, density altitude, and an engine operational status.

22. The flight control system as in claim 19, further comprising an active vibration controller for controlling vibration induced from the main and tail rotors of the helicopter.

23. The flight control system as in claim 19, wherein said automatic rotor speed control is configured to control said full authority digital engine controller to automatically adjust said speed of said at least one rotor in response to said plurality of flight data, said plurality of flight data comprises at least one of a plurality of inhibits comprising at least one of an engine operational status having only one engine operative, said height above ground level being below a predetermined height, a pressure altitude being at or above a predetermined pressure altitude, a density altitude being at or above a predetermined density altitude, an outside air temperature being at or above a predetermined temperature, a knot indicated air speed being below a predetermined speed, and any combinations thereof.

24. A rotary-wing aircraft comprising:
   a main rotor;
   a tail rotor;
   a flight control system; and
   an automatic rotor speed control resident on said flight control system, said automatic rotor speed control configured to transition a speed of said main and tail rotors between a high speed, normal operational mode and a low speed, low noise operational mode in response to at least one of a plurality of received flight information and a height above ground level without pilot action.

* * * * *

UNITED STATES PATENT AND TRADEMARK OFFICE
CERTIFICATE OF CORRECTION

| | | |
|---|---|---|
| PATENT NO. | : 9,235,217 B2 | Page 1 of 1 |
| APPLICATION NO. | : 11/536128 | |
| DATED | : January 12, 2016 | |
| INVENTOR(S) | : Greg W. Barnes | |

It is certified that error appears in the above-identified patent and that said Letters Patent is hereby corrected as shown below:

IN THE CLAIMS:

In claim 15, column 6, line 31; delete "a-said" and replace with --a said--

Signed and Sealed this
Fourteenth Day of June, 2016

Michelle K. Lee
*Director of the United States Patent and Trademark Office*